A. WINTERS.
Hand Rake.
No. 85,154.
Patented Dec. 22, 1868.
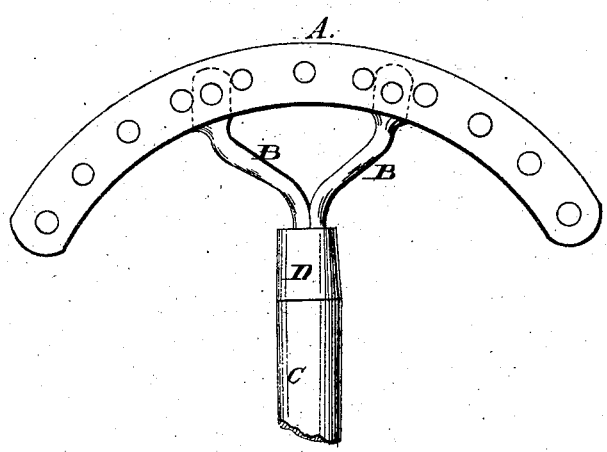
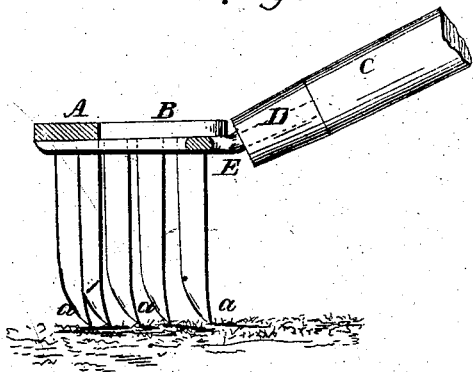

A. WINTERS, OF WASHINGTON, PENNSYLVANIA.

Letters Patent No. 85,154, dated December 22, 1868.

IMPROVEMENT IN HAND-RAKES.

The Schedule referred to in these Letters Patent and making part of the same.

*To all whom it may concern:*

Be it known that I, A. WINTERS, of Washington, in the county of Washington, and State of Pennsylvania, have invented a new and improved Hand-Rake; and I do hereby declare that the following is a full, clear, and exact description thereof, which will enable those skilled in the art to make and use the same, reference being had to the accompanying drawings, forming part of this specification, in which—

Figure 1 is a top view of my invention.

Figure 2 is a side view of the same.

Similar letters of reference indicate corresponding parts.

The object of this invention is to provide a more efficient hand-rake than heretofore in use.

It consists in forming the rake-head curved and attached to the handle, with its concave side towards the handle.

The tang is also bent up at the proper angle, so that the whole of the teeth will operate in contact with the ground.

The teeth are also curved to operate more effectively in gathering up the rubbish on the ground.

In the drawings—

A is the curved rake-head, and

B B, the two branches of the tang, which branches are united to the rake-head, as shown.

C is a portion of the handle, and

D, the ferrule on the end of the same.

The points of the rake-teeth are curved, as shown at $a\ a\ a$, &c., and conduce to the efficiency of the rake.

The branches B B of the tang may be affixed to the extreme ends of the rake-head, if desired, or a single-parted tang may be employed, instead of the branched tang shown.

The tang E is bent upward, as shown, so as to allow all of the rake-teeth to act on the surface at once, when in use.

The advantage of the curved head consists in its power to retain the leaves and other trash which it collects.

I claim as new, and desire to secure by Letters Patent—

As a new article of manufacture, the metal rake-head, consisting of the curved head A, the straight teeth having the bent points $a$, and the bent bifurcated tang B, constructed and arranged to operate in the manner described, for the purpose specified.

A. WINTERS.

Witnesses:
JOHN GRAYSON, Jr.,
GEO. S. HART.